Jan. 14, 1969     C. F. MEYER     3,422,243
RESISTANCE WELDING CONTROL SYSTEM
Filed May 13, 1966
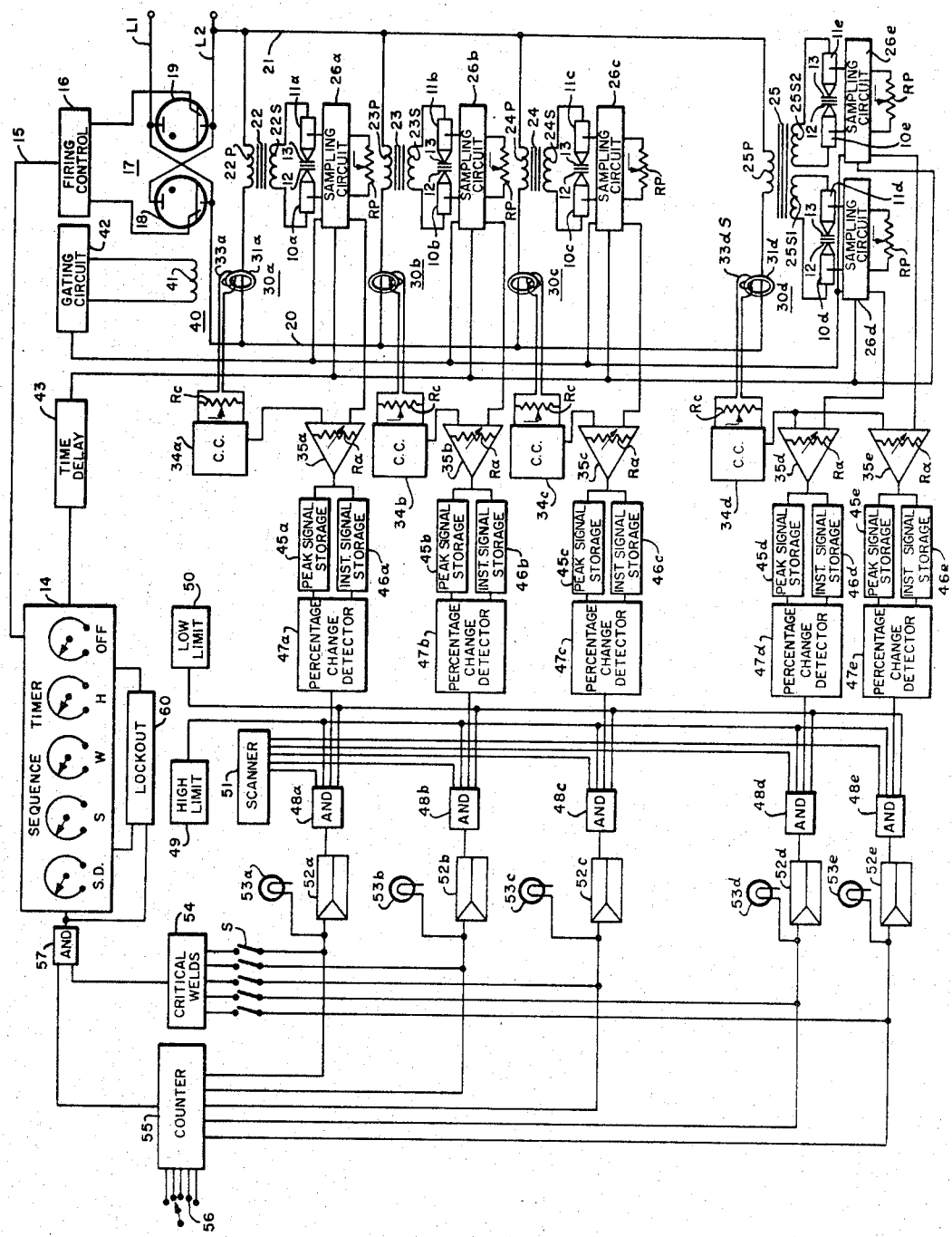
*INVENTOR.*
CHARLES F. MEYER
BY

United States Patent Office 3,422,243
Patented Jan. 14, 1969

3,422,243
RESISTANCE WELDING CONTROL SYSTEM
Charles F. Meyer, Wauwatosa, Wis., assignor to Square D Company, Park Ridge, Ill., a corporation of Michigan
Filed May 13, 1966, Ser. No. 549,833
U.S. Cl. 219—110                          9 Claims
Int. Cl. B23k *11/00;* B23k *11/24;* B23k *9/10*

ABSTRACT OF THE DISCLOSURE

Control circuitry for a resistance welding machine. Detecting means are coupled across each pair of a plurality of pairs of electrodes, to detect when a predetermined percentage difference in the sampling voltage has occurred and to generate an output signal which is representative of this change. The output signal from each detecting unit is counted and a signal is generated to switch the apparatus to a nonconducting state when the number of changes equals a predetermined number.

---

This invention relates to resistance welding control systems and more particularly, to an electrical system capable of monitoring changes in resistance occurring simultaneously across the work between a plurality of pairs of welding electrodes and terminating the flow of welding current through the electrodes when the work between a selected number and selected pairs of electrodes evidences a predetermined resistance change.

In United States Patent No. 3,345,493, issued Oct. 3, 1967, and assigned by the inventors Marvin A. Guettel and Charles F. Meyer to the assignee of the present invention, a commercially acceptable control system capable of successfully monitoring changes in resistance across two or more metal parts of varying thickness during formation of a weld therebetween, is disclosed. The control system according to the present invention is arranged to not only monitor the changes in resistance occurring during the formation of a single weld, as is achieved by the Guettel et al control system, but will monitor the resistance change across metal parts as caused by welding current flow through a plurality of pairs of welding electrodes and will terminate the flow of welding current when a predetermined resistance change occurs across the metal parts positioned between a predetermined number of pairs of electrodes and additionally, if desired, after a predetermined resistance change has occurred between one or more selected pairs of electrodes.

It is an object of the present invention to provide a control system for a resistance welder that will monitor the change in resistance across metal parts positioned between each of a plurality of pairs of welding electrodes during welding current flow through the parts and terminate the flow of welding current when a predetermined resistance change occurs across the parts between a selected number of pairs of welding electrodes and, if desired, selected pairs of electrodes.

Another object is to provide a resistance welder apparatus with a plurality of pairs of welding electrodes with each pair being arranged to pass welding current through metal parts for the purpose of welding the parts together and to control the flow of welding current through the respective pairs of electrodes with a switch means, such as a single pair of inversely connected electronic switches connected in a circuit common to all of the pairs of electrodes whereby the welding current through all of the pairs of electrodes is simultaneously initiated and terminated, and to control the conductive state of the electronic switches with a means capable of detecting a resistance change across the metal parts between each pair of electrodes and causing the switch means to switch to a non-conductive state and thereby terminate welding current flow when a preselected resistance change has occurred across the metal parts between a selected number and preselected pairs of electrodes.

An additional object is to provide a control system for monitoring a change in resistance across metal parts between a plurality of pairs of welding electrodes while welding current is flowing through the electrodes and to control the welding current flow with a switch means, e.g., a pair of ignitrons connected in inverse parallel relation with each other in a circuit that is common to all of the pairs of electrodes whereby the welding current through all of the pairs of electrodes is simultaneously initiated and terminated as the switch means is switched from a conductive to a non-conductive state and to provide each pair of electrodes with an individual means for detecting the voltage across the electrodes as caused by welding current flow and to provide a means connected in the common circuit for supplying each individual detecting means with input signals for causing the detecting means to sample the voltage across the electrodes at instants during each half cycle of welding current flow when the current flow is at a maximum value and to provide a means for delaying the sampling of the voltage across the electrodes for a predetermined interval after welding current flow is initiated and cause each detecting means to supply an output signal when a predetermined percentage change has occurred in the voltage sampled thereby and to provide a means for indicating the presence of the output signal and causing the switch means to switch to a nonconductive state and thereby terminate welding current flow through all of the electrodes when a predetermined number and selected individual detecting means have supplied an output signal.

Further objects and features of the invention will be readily apparent to those skilled in the art from the following specification and the appended drawings illustrating certain preferred embodiments in which:

The single figure diagrammatically shows a control system according to the present invention for simultaneously monitoring changes in resistance across metal parts between a plurality of pairs of welding electrodes in a resistance welder apparatus.

In the drawing, the control system shown is capable of simultaneously monitoring variations in resistance across a plurality of loads in response to current flow through the loads and in accordance with this invention is shown in conjunction with a resistance welding apparatus comprising a plurality of pairs of welding electrodes designated as 10a–11a, 10b–11b, 10c–11c, 10d–11d and 10e–11e, movable by means, not shown, into clamping engagement with two or more metal workpieces designated as 12 and 13 which may vary in thickness or otherwise vary in electrical resistance. While the metal workpieces 12 and 13 are shown as being individual pieces, the parts may comprise a single pair of metal parts which are to be secured together at a plurality of spaced points as may occur in an automotive vehicle when two large sections of the body are welded together or portions of the body are welded to the frame in a welding apparatus commonly known as a press welder.

The control system as described herein operates in conjunction with a resistance weld sequence timer indicated by the numeral 14. One form of a timer 14 that may be used is disclosed in United States Patent No. 3,243,652, issued Mar. 29, 1966, to the inventors Charles F. Meyer and James J. Eckl. The timer 14 supplies suitable signals through a lead 15 to a firing control 16. The firing control 16, which also may be of any well known type, e.g., a circuit as disclosed in United States Patent 3,229,161, filed Mar. 25, 1962, by the inventor Ernest A. Anger, is arranged to provide a switch means 17, shown as a pair of inversely connected ignitrons 18 and 19, with suitable signals to control the flow of alternating current from a pair of supply leads L1 and L2 to a common circuit including a pair of leads 20 and 21.

The weld timer 14 is arranged to control the duration of "squeeze," "weld," "hold," and "off" periods, as is well known in the resistance welding art. If desired, the weld timer 14 may also provide a "squeeze delay" period. During the squeeze period the electrodes 10a–e and 11a–e move into engagement with the work-pieces 12 and 13 under predetermined pressure. At the end of the squeeze period, the timer 14 provides a suitable series of signals through the lead 15 to the firing control 16 thereby to cause the ignitrons 18 and 19 to fire in a lead-trail fashion and conduct alternate half cycles of alternating current through the circuit which includes leads 20 and 21. If desired, the weld timer 14 and the firing control 16 may also cause the ignitrons 18 and 19 to conduct for less than full half cycles of the alternating current supply to provide "heat control" for the welding apparatus.

Each pair of electrodes 10a–e and 11a–e is connected across a secondary winding of a welding transformer. That is, electrodes 10a and 11a are connected across the secondary winding 22S of the transformer 22. Similarly, the electrode pairs 10b and 11b, 10c and 11c, 10d and 11d, and 10e and 11e are respectively connected across the secondary windings 23S, 24S, 25S1 and 25S2 of the welding transformers 23, 24 and 25. The transformers 22–25 have primary windings designated as 22P–25P. As shown, the primary windings 22P–25P are connected in parallel between leads 20 and 21 so as to be in a circuit which is common to the ignitrons 18 and 19. The transformer 25 has dual secondary windings 25S1 and 25S2 respectively supplying the electrode pairs 10d–11d and 10e–11e. If desired, the transformers 22–24 may have similar additional secondary windings to supply additional pairs of electrodes in the same manner as transformer 25 supplies the dual pairs of electrodes.

Each pair of electrodes is connected to supply an input signal to an individual sampling circuit. That is, the electrodes 10a and 11a are connected through suitable leads to supply an input signal to a sampling circuit 26a having a function of the voltage appearing across the electrodes 10a–11a in response to the flow of welding current therebetween. Similarly, the electrode pairs 10b–11b, 10c–11c, 10d–11d and 10e–11e are connected to supply input signals to the respective sampling circuits 26b, 26c, 26d, and 26e. Each of the sampling circuits 26a–e is provided with an individual adjustment means for establishing the peak value of the sampled electrode voltage in a manner set forth in the Guettel et al. application. In the drawing, the adjustment means for establishing the peak voltage values for the sampling circuits are designated as the adjustable resistors RP. As the operation of each of the sampling circuits is identical, only the operation of the sampling circuit 26a will be described, it being understood that the sampling circuits 26b, 26c, 26d and 26e operate in the same manner as the sampling circuit 26a.

The input signal provided by the current flow through the electrodes 10a and 11a includes the sum of the voltage drops in the electrodes 10a and 11a, the work-pieces 12 and 13 and the surface resistances between the electrodes and the work-pieces 12 and 13. Because one of the purposes of the monitor is to precisely detect changes in the interface resistance, preferably the leads between the electrodes 10a and 11a and the sampling circuit 26a should be connected as closely as possible to the work-pieces 12 and 13 to detect only the interface resistance between the work-pieces 12 and 13 and to exclude the effects of the other impedances listed above. From a practical standpoint, however, it is desirable to connect the leads directly to the electrodes 10a and 11a and to electrically separate the signal supplied to the sampling circuit from the effects of the other impedances.

The welding current also produces a strong magnetic field about the electrodes, the strength of which depends upon the magnitude of the welding current and the shape and mass of the work-pieces and other variable factors. This field induces an inductive voltage component in the leads between the electrodes and the sampling circuits which obscures the voltage introduced by the resistance across the parts 12 and 13. The effects of this induced voltage signal at the electrodes 10a–e and 11a–e thus must be eliminated so that the voltage signal output of each of the sampling circuits 26a–e will be directly proportional to the change in the resistance between the parts 12 and 13. The voltage drop as caused by the resistance between the parts 12 and 13 is a maximum during each half cycle when the welding current is a maximum. Similarly, as the inductive voltage component is a function of the rate of change of current, during the instants of maximum welding current flow during each half cycle, the inductive voltage component will be at a minimum. The instant when the inductive component is at a minimum for each half cycle is detected by means of the air-core current transformer 40 which, in response to the flow of welding current, provides a voltage signal ninety degrees out of phase therewith so that when the welding current is maximum, the voltage signal from the transformer 40 is zero.

The air core current transformer 40 is arranged to be energized by the current flow in the common circuit which includes the leads 20 and 21. Preferably, the transformer 40 comprises one or more turns of wire adjacent the common lead 20 which carries current to the welding electrodes 10a–e and 11a–e to form a secondary winding 41 which has its respective ends connected through the leads to a gating circuit 42 to provide an input voltage to the gating circuit 42 which is a function of the welding current and which is substantially ninety degrees out of phase with the welding current as is disclosed in the Guettel et al. application.

The gating circuit 42 supplies an input gating signal to each sampling circuit 26a–e which in response thereto supplies an output signal representative of the voltage drop across the electrodes 10a–e and 11a–e to the amplifiers 35a–e at the instant during each half cycle when the welding current flow has a maximum value. Additionally, at the beginning of welding current flow, the sequence timer 14 supplies an output signal to a time delay circuit 43 which in response thereto supplies an input signal to each of the sampling circuits 26a–e. The signal from the time delay circuit 43 to the sampling circuits is delayed for a predetermined time interval after initiation of welding current flow and prevents the sampling circuits 26a–e from supply signals to the amplifiers 35a–e to prevent the output signal from the sampling circuits 26a–e from being influenced by the effects of improper seating of the electrodes and other causes.

A means for compensating the signal supplied to the sampling circuit 26a includes a current transformer 30a having an iron core 31a and its primary winding effectively in series with the electrodes 10a and 11a by having its core 31a surround the lead to the primary winding 22P of the transformer 22. The transformer 30a has a secondary winding 33a connected by a pair of leads to the inputs of a current compensating circuit designated by the numeral 34a. As disclosed in the Guettel et al. application, any variations in current through the welding electrodes 10a and 11a is reflected as a voltage change at the output of the current compensator 34a. The electrode pairs 10b and 11b and the electrode pairs 10c and 11c also have individual current transformers 30b and 30c associated therewith with each having cores surrounding the supply leads to the primary windings 23P and 24P to supply signals to individual current compensating circuits designated as 34b and 34c. As the electrode pair 10d and 11d and the electrode pair 10e and 11e are each connected through the dual secondary windings 25S1 and 25S2 to be energized from the same primary winding 25P, a single current transformer 30d is provided having a core 31d surrounding the lead to primary winding 25P. A secondary winding 33ds of the transformer 30d supplies an input signal to a current compensating circuit 34d in the same manner secondary winding 33a supplies the current compensating circuit 34a.

As variations in welding current magnitude will distort the value of the detected resistance across the metal parts 12 and 13, the current compensating circuits 34a, 34b, 34c, and 34d each respectively supplies a suitable output to an amplifier 35a, 35b, 35c, 35d and 35e to affect the gain of the amplifiers and cause the amplifiers to provide an output voltage which is proportional to the resistance between the work parts 12 and 13. The output level of each current compensating circuit 34a–d to the amplifiers 35a–e is adjustable by a suitable means indicated as resistors Rc which are adjusted as disclosed in the Guettel et al. application.

Thus a predetermined time after welding current flow through the electrodes 10a–e and 11a–e is initiated, at precisely the instants when welding current flow is at a maximum, the sampling circuits 26a–e will supply a signal having a function of the voltage drop across the parts 12 and 13 to the respective amplifiers 35a–e. The amplifiers 35a–e each are provided with a means for adjusting their gain which means are designated by the adjustable resistors Ra. Further, the gain of each amplifier 35a–e is compensated for variations in welding current flow by the output signals of the current compensating circuits 34a–d. The output signals from each of the amplifiers 35a–e is simultaneously impressed on a peak signal storage circuit and an instantaneous signal storage circuit. That is, the output of the amplifier 35a is impressed on a peak signal storage circuit 45a and an instantaneous signal storage circuit 46a. Similarly, the outputs of the amplifiers 35b–e are impressed on the peak signal storage circuits 45b–e and the instantaneous signal storage circuits 46b–e.

The peak signal storage circuits 45a–e are each arranged to receive and store the value of the highest voltage signal received from the respective amplifiers 35a–e. The instantaneous signal storage circuits 46a–e are each arranged to receive and follow the changes in the voltage signals from the amplifiers 35a–e. The peak signal storage circuits and the instantaneous signal storage circuits each have an output connected to an input of a percentage change detector circuit. That is, the peak signal storage 45a and the instantaneous signal storage 46a each supply an input signal to a percentage change detector 47a. Similarly, the peak signal storage circuits 45b–e and the instantaneous signal storage circuits 46b–e supply inputs to the percentage change detectors 47b–e.

The percentage change detectors 47a–e each are arranged to supply an output signal change when the differences between the signals stored in the peak signal storage circuits 45a–e and the instantaneous signal storage circuits 46a–e equals a predetermined value which may be adjustable, if desired, as disclosed in the Guettel et al. application.

Each percentage change detector supplies an input to a logic AND circuit. That is, the percentage change detector 47a supplies an input to an AND logic circuit 48a. Similarly, the percentage change detectors 47b–e supply AND logic circuits 48b–e with input signals. The AND logic circuits 48a–e also receive inputs from a high limit timing circuit 49, a low limit timing circuit 50 and a scanning unit 51. Thus each AND logic circuit receives inputs from four different signal sources and when proper signals from each of the sources are present, the AND logic circuit will supply an output signal change to a logic memory unit coupled therewith. The low limit timer 50 is arranged to supply an output signal change a predetermined time interval after the time delay unit 43 causes the sampling circuits 26a–e to begin sampling the voltages across the electrodes coupled thereto. The high limit timer 49 is arranged to provide an output signal change a predetermined time interval after welding current flow is initiated and preferably slightly prior to the instant when weld time is terminated as controlled by the sequence timer 14. The scanner 51 is arranged to sequentially supply input signals to the AND logic circuits 48a–e to prevent any two of the AND logic circuits 48a–e from simultaneously receiving the identical signals from the scanner 51. The AND logic circuits 48a–e and the inputs thereto are arranged so that when all of the inputs from the high limit timer 49, the low limit timer 50 and the scanner 51 are identical, the AND logic circuit will change its output signal in response to a change in output signals of the percentage change detector circuits 47a–e coupled thereto. The AND logic circuits 48a–e are respectively coupled with a memory logic circuit 52a–e. The memory circuits 51a–e thus in response to the output signal change from the respective AND logic circuits 48a–e each provide an output signal change. The output of each of memory circuits 52a–e is coupled to a suitable visual indicating means. That is, the memory 52a is coupled to an indicating means 53a. Similarly, the memories 52b–e are coupled to indicating means 53b–e. Upon the occurrence of an output signal change from the memories 52a–e the respective indicating means 53a–e will become illuminated, thereby indicating that a predetermined change in resistance has occurred across the electrodes 10a–e and 11a–e. The output signal change of each memory 52a–e is supplied to one of the inputs of a counter 55 which is described in the Meyer et al. application and has an output supplying one of the inputs to an AND logic circuit 57. Additionally, the outputs of the memories 52a–e are coupled through suitable means indicated by selector switches S to a critical weld logic circuit 54 which has an output supplying a second input to the AND logic circuit 57. The counter 55 is programmed by a suitable means indicated as a switch 56 which is arranged to select the number of input signal changes which the counter is to receive before the counter will provide an output to the AND circuit 57. The critical weld circuits 54 are arranged so that its output will not change until the respective memory or memories 52a–e selected by the switches S have provided an output signal change. Thus it is apparent that if the proper number of percentage change detectors 47a–e have their output switched during the time interval dictated by the low limit timer 50 and the high limit timer 49, the counter 55 will receive a suitable number of inputs and when the number of inputs is equal to the value selected by the switch 56, the counter 55 will supply a proper input to the AND circuit 57. Similarly, if each of the critical welds, as selected by the switch S, have occurred and the proper memories 52a–e have switched, the inputs to the AND circuit will be identical. The AND circuit 57 will then supply a suitable input to the sequence timer 14 which is arranged to terminate welding current flow thereupon. It is apparent that if neither the number of proper welds as detected by the counter 55 and the proper critical welds as selected by the critical weld selector switch S have occurred, the AND circuit will not supply a proper signal during the weld time interval and the termination of weld current flow will be controlled by the sequence timer 14.

A lockout memory circuit indicated by the numeral 60 receives input signals from the AND circuit 57 and the weld timer 14 and provides an output signal to the sequence timer 14. The lockout circuit 60 acts as a logic memory and provides an input signal to the sequence timer 14 upon failure of the AND circuit 57 to supply a proper signal change to the sequence timer 14 that will cause the sequence timer 14 to terminate welding current flow. The output signal from the lockout circuit 60 to the sequence timer 14 will prevent the sequence timer 14 from repeating a subsequent welding sequence of operations and thus a repetition of a welding operation wherein the proper number and/or selected critical welds are not formed between the metal parts 12 and 13.

Further the indicating means 53a–e are provided so an operator of the welding apparatus may observe the particular welds between the pairs of electrodes 10a–e and 11a–e, that did not evidence the desired resistance change. Thus when the lockout circuit 60 is activated to prevent a repetition of the welding operation, the indicating means 53a–e will advise the operator of the particular electrodes 10a–e and 11a–e requiring attention so that all of the pairs of electrodes 10a–e and 11a–e will provide satisfactory welds.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a resistance welding apparatus, the combination comprising: a plurality of pairs of welding electrodes each arranged to pass alternating current through metal parts, switch means connected in a circuit common to all of the pairs of electrodes, said switch means being switchable from a nonconducting to a conducting state for passing alternate half cycles of welding current through the electrodes from an alternating current source, a plurality of individual detecting means, each of said detecting means being independently coupled to one of the pairs of electrodes for sampling a voltage across the electrodes in response to current flow through the pair of electrodes coupled thereto and providing an output signal change when a percentage difference between an initially detected voltage and a subsequently detected voltage equals a predetermined value, means including a counter having inputs responsive to the output signal changes from each detecting means for providing an output signal when the number of output signal changes equals a predetermined number, means for gating the output signal changes from the respective detecting means and preventing the counter from simultaneously counting more than one signal change, and control means having an input connected to receive the output signal from the counter for switching the switch means to its nonconducting state in response to the output signal from the counter.

2. The combination as recited in claim 1 including means connected in a circuit common to all of the pairs of electrodes for supplying an input signal to each detecting means for causing the detecting means to sample the voltage across the electrodes at instants during each half cycle of welding current flow when the welding current flow is at a maximum value.

3. The combination as recited in claim 2 including a plurality of individual current compensating means each of which is connected in a circuit to one of the pairs of electrodes and supplies a signal to the detecting means coupled thereto for compensating the voltage detected by the detecting means for variations in welding current through the electrodes coupled thereto.

4. The combination as recited in claim 1 including means connected to supply an input signal to each detecting means for delaying the sampling of the voltage across the electrodes by the detecting means for a predetermined time interval after the initiation of welding current flow.

5. The combination as recited in claim 1 including means having inputs connected to receive the output signal changes from a selected one of the plurality of detecting means and having an output providing a signal for preventing the switch means from switching to a nonconductive state before the selected one of said plurality of detecting means has provided an output signal change.

6. The combination as recited in claim 1 including timing means for causing the coutner to count output signal changes only during a predetermined time interval.

7. The combination as recited in claim 1 including a low limit timing means and a high limit timing means each providing output signals for causing the counter to count output signal changes only during a predetermined time interval of welding current flow.

8. The combination as recited in claim 1 including a plurality of individual indicating means each of which is coupled to one of the plurality of the detecting means for indicating a change in the output signal from the detecting means coupled thereto.

9. The combination as recited in claim 1 wherein the detecting means includes means for adjusting the sampled voltage across the electrodes.

References Cited

UNITED STATES PATENTS

| | | | |
|---|---|---|---|
| 2,508,330 | 5/1950 | Callender et al. | 219—110 |
| 3,141,950 | 7/1964 | Chiasson | 219—114 |
| 3,205,378 | 9/1965 | Kline | 219—108 |

RICHARD M. WOOD, *Primary Examiner.*

P. W. MAY, *Assistant Examiner.*

U.S. Cl. X.R.

219—114